United States Patent
Konda (10) Patent No.: US 11,868,556 B2
(45) Date of Patent: Jan. 9, 2024

(54) PAIRING METHOD, POSITION DETECTING SYSTEM, POSITION INDICATOR AND POSITION DETECTING APPARATUS

(71) Applicant: Wacom Co., Ltd., Saitama (JP)

(72) Inventor: Yoshifumi Konda, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/207,318

(22) Filed: Mar. 19, 2021

(65) Prior Publication Data

US 2021/0208759 A1  Jul. 8, 2021

Related U.S. Application Data

(63) Continuation of application No. 16/378,210, filed on Apr. 8, 2019, now Pat. No. 10,969,901, which is a continuation of application No. PCT/JP2017/032466, filed on Sep. 8, 2017.

(30) Foreign Application Priority Data

Oct. 18, 2016  (JP) .................................. 2016-204444

(51) Int. Cl.
*G06F 3/041*  (2006.01)

(52) U.S. Cl.
CPC .......... *G06F 3/04162* (2019.05); *G06F 3/041* (2013.01)

(58) Field of Classification Search
CPC .................. G06F 3/03545; G06F 2213/3814
See application file for complete search history.

(56) References Cited

U.S. PATENT DOCUMENTS

| | | | |
|---|---|---|---|
| 9,329,708 B2 * | 5/2016 | Westhues | G06F 3/0446 |
| 9,632,598 B1 * | 4/2017 | Sundara-Rajan | G06F 1/3262 |
| 2012/0159472 A1 | 6/2012 | Hong et al. | |
| 2015/0002425 A1 * | 1/2015 | Lee | G06F 3/046 345/173 |
| 2015/0277587 A1 * | 10/2015 | Chandran | G06F 3/03545 345/173 |
| 2016/0077784 A1 | 3/2016 | Yamada | |
| 2016/0100303 A1 | 4/2016 | Kim et al. | |
| 2016/0246390 A1 | 8/2016 | Lukane et al. | |
| 2016/0309286 A1 * | 10/2016 | Son | H04W 4/80 |

FOREIGN PATENT DOCUMENTS

| | | |
|---|---|---|
| JP | 2014-099814 A | 5/2014 |
| JP | 5732600 B1 | 6/2015 |
| JP | 2016-066342 A | 4/2016 |
| WO | 2016/117004 A1 | 7/2016 |

* cited by examiner

*Primary Examiner* — Kevin M Nguyen
(74) *Attorney, Agent, or Firm* — Seed IP Law Group LLP (57) ABSTRACT

A pairing method between a stylus and a position detecting apparatus that detects a position pointed to by the stylus includes: sharing, by the position detecting apparatus, a sensor identifier (ID) that is included in an uplink signal transmitted to the stylus while the stylus and the position detecting apparatus are proximate to each other at or within a predetermined distance, the sensor ID uniquely identifying the position detecting apparatus; and determining, by the position detecting apparatus using the sensor ID, whether information is transmitted from the stylus, the information being transmitted via a first wireless communication having a range that is longer than the predetermined distance.

14 Claims, 8 Drawing Sheets

PAIRING METHOD, POSITION DETECTING SYSTEM, POSITION INDICATOR AND POSITION DETECTING APPARATUS

BACKGROUND

Technical Field

The present disclosure relates to a pairing method, a position detecting system, a position indicator and a position detecting apparatus, and in particular relates to a pairing method, a position detecting system, a position indicator and a position detecting apparatus for performing a pairing operation between the position indicator and the position detecting apparatus.

Background Art

A position detecting system including a position detecting apparatus which is, for example, a digitizer or a tablet and a position indicator which is, for example, an electronic pen (stylus) conforming to electromagnetic induction (EMR) method or active capacitive coupling method has been known. In this type of position detecting systems, a position indicator is moved on a position detecting apparatus to thereby allow a user to perform manipulation of inputting characters or figures.

Among the position detecting systems, there are ones that can transmit information such as serial numbers or writing pressures of position indicators from the position indicators to position detecting apparatuses. Japanese Patent No. 5732600 discloses an example of such position detecting systems. A position indicator according to the example transmits writing pressure data to a position detecting apparatus by digital wireless communication (specifically, Bluetooth (registered trademark)).

Meanwhile, when a user performs manipulation of inputting characters or figures using a position indicator, it is necessary to make the position indicator paired with a position detecting apparatus beforehand. Conceivable specific pairing methods include, for example, a method in which a pairing request is transmitted from a position indicator, and is received by a position detecting apparatus. If there are multiple position indicators near one position detecting apparatus, it is conceivable to decide, at the position detecting apparatus, the reception intensities of pairing requests from the individual position indicators, and treat, as a pairing target, a position indicator that has transmitted a pairing request with the highest intensity.

However, according to the above-mentioned pairing method, if there are a number of position indicators at very close positions, for example, in a classroom or the like, there is a fear that a pairing connection might be established between a pair that is different from a pair that should really be paired. In addition, there may be cases where writing with a different position indicator is desired to be enabled temporarily such as a case where individual students are using position detecting apparatuses in a classroom, and their teacher is walking in the classroom to make corrections in position detecting apparatuses of the individual students using a position indicator of the teacher, and it is difficult to realize such writing with the above-mentioned pairing method. It is conceivable to specify a position indicator to be a pairing target expressly on a position detecting apparatus, but such manipulation is complicated, and if the position detecting apparatus does not have a display unit, such specifying itself becomes difficult first of all.

BRIEF SUMMARY

Accordingly, an object of the present disclosure is to provide a pairing method, a position detecting system, a position indicator and a position detecting apparatus that can perform pairing between the position indicator and the position detecting apparatus expressly and with simple manipulation.

A pairing method according to the present disclosure includes sharing, between a position indicator and a position detecting apparatus, predetermined sharing information that becomes sharable if the position indicator and the position detecting apparatus are proximate to each other at or within a predetermined distance; and determining, by a first one of the position indicator and the position detecting apparatus and using the shared sharing information, whether information received by a first communication device having a range longer than the predetermined distance is information transmitted by a second one of the position indicator and the position detecting apparatus, the first one of the position indicator and the position detecting apparatus being different from second one of the position indicator and the position detecting apparatus.

A position detecting system according to the present disclosure includes a position indicator and a position detecting apparatus. The position indicator includes a first processor which, in operation, performs a process that shares, with the position detecting apparatus, predetermined sharing information that becomes sharable if the position indicator is proximate to the position detecting apparatus at or within a predetermined distance, and a first communication device which, in operation, performs communication at a longer range than the predetermined distance, wherein the first processor, in operation, causes the first communication device to periodically transmit the sharing information. The position detecting apparatus includes a second processor which, in operation, performs a process that shares the sharing information with the position indicator, and a second communication device which, in operation, performs communication with the first communication device, wherein the second processor, in operation, determines using the sharing information shared by the second processor, whether information received by the communication device is information transmitted by the position indicator.

In addition, a position detecting system according to another aspect of the present includes a position detecting apparatus and a position indicator. The position indicator includes a first processor which, in operation, performs a process that shares, with the position detecting apparatus, predetermined sharing information that becomes sharable if the position indicator is proximate to the position detecting apparatus at or within a predetermined distance, and a first communication device which, in operation, performs communication at a longer range than the predetermined distance, wherein the first processor, in operation, causes the first communication device to periodically transmit the sharing information. The position detecting apparatus has a second processor which, in operation, performs a process that shares the sharing information with the position indicator, and a second communication device which, in operation, performs communication with the first communication device, wherein the second processor, in operation, determines using the sharing information shared by the second processor, whether information received by the second communication device is transmitted by the position indicator.

A position indicator according to the present disclosure includes a sensor which, in operation, detects proximity information indicating proximity to an object, a transmitter, and a processor which, in operation, periodically acquires the proximity information from the sensor, and causes the transmitter to transmit a pairing request including the acquired proximity information.

A position detecting apparatus according to the present disclosure includes a communication device which, in operation, receives first proximity information indicating proximity between any of a plurality of position indicators and an object; a sensor which, in operation, detects second proximity information indicating proximity to any of the plurality of position indicators; and a processor which, in operation, retains the first proximity information received by the communication device and the second proximity information detected by the sensor each in a time series, determines whether the first and second proximity information retained in the time series agree with each other, and if the processor determines that the first and second proximity information agree with each other, the processor establishes a pairing connection with a position indicator among the plurality of position indicators that transmitted the first proximity information retained in the time series.

According to the present disclosure, a pairing connection can be established between a position indicator and a position detecting apparatus simply by making predetermined sharing information shared between the position indicator and the position detecting apparatus, the predetermined sharing information becoming sharable when the position indicator and the position detecting apparatus are proximate to each other at or within a predetermined distance from each other. Accordingly, pairing between the position indicator and the position detecting apparatus can be performed expressly and with simple manipulation.

In addition, according to an aspect of the present disclosure, a user can cause the position indicator and position detecting apparatus to share sharing information (information regarding changes in proximity) simply, for example, by bringing the position indicator close to the position detecting apparatus and separating the position indicator from the position detecting apparatus several times (more specifically, tapping several times).

DETAILED DESCRIPTION OF THE PREFERRED EMBODIMENTS

Hereinafter, preferred embodiments of the present disclosure are explained in detail with reference to attached figures.

Figure 1:
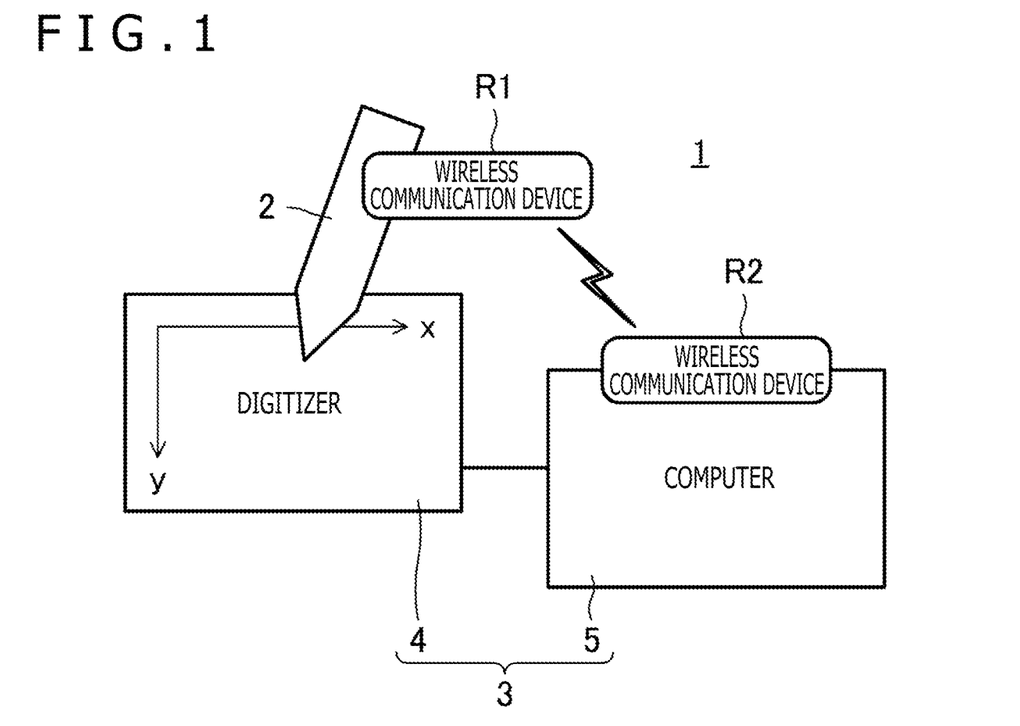
FIG. 1 is a figure depicting an overall configuration of a position detecting system according to an embodiment of the present disclosure.

FIG. 1 is a figure depicting an overall configuration of a position detecting system 1 according to an embodiment of the present disclosure. As depicted in the figure, the position detecting system 1 includes an electronic pen 2 which is a position indicator and a position detecting apparatus 3 including a digitizer 4 and a computer 5.

The electronic pen 2 is an electronic device (stylus) having an appearance similar to a writing instrument such as a ballpoint pen or a fiber-tipped pen, and although not illustrated, has a central processing unit, storage devices such as a cache memory or a hard disk, an electrode arranged at the pen point, a switch arranged on a housing surface and communication apparatuses. Functional blocks of the electronic pen 2 depicted in FIG. 3 or the like mentioned below are realized by the central processing unit executing a program stored in a storage device in advance. An illustrated wireless communication device R1 is one of communication apparatuses provided to the electronic pen 2, and can perform wireless communication with a wireless communication device R2 of the computer 5 mentioned below. This wireless communication is near field wireless communication such as Bluetooth (registered trademark), for example, and is referred to as a "first communication device" in some cases. The electronic pen 2 can also communicate with the position detecting apparatus 3 via an electrode at the pen point using a communication device (hereinafter referred to as a "third communication device") having a shorter range than the range of the first communication device, such as EMR method or active capacitive coupling method mentioned above, for example.

The digitizer 4 has a tabular panel surface, and an electrode group (not illustrated) formed inside the panel surface. Specific shapes of the electrode group that can be used are various types of shapes such as linear forms, loop forms, rectangular shapes or the like. The electrode group, if it has a linear form (a linear electrode group), includes a plurality of linear electrodes arranged in parallel with an x axis parallel with one side of the panel surface and at constant intervals, and a plurality of linear electrodes arranged in parallel with a y axis orthogonal to the x axis in the panel surface and at constant intervals. The digitizer 4 can detect the position of the electronic pen 2 on the panel surface using such an electrode group.

Although not illustrated, the computer 5 is a general computer having a central processing unit, storage devices such as a cache memory or a hard disk, input apparatuses such as a keyboard or a mouse, output apparatuses such as a display or a speaker, and communication apparatuses. Functional blocks of the position detecting apparatus 3 depicted in FIG. 3 or the like mentioned below are realized by, in the computer 5, the central processing unit executing a program stored in a storage device in advance. The digitizer 4 is one of input apparatuses provided to the computer 5, and is connected with the computer 5 through a communication cable such as a universal serial bus (USB) cable, for example.

In addition, the illustrated wireless communication device R2 is one of communication apparatuses provided to the computer 5, and can perform wireless communication with the wireless communication device R1 of the electronic pen 2.

The position of the electronic pen 2 detected by the digitizer 4 is supplied to the computer 5 serially through the above-mentioned communication cable. In addition, the electronic pen 2 can detect a stress (writing pressure) applied to the pen point from the digitizer 4, and this writing pressure is supplied from the electronic pen 2 to the computer 5 serially through the above-mentioned wireless communication devices R1 and R2. Besides, a manufacturer of the electronic pen 2, a complying method, a pen identifier (ID) indicating an identification number, on/off information regarding a switch (not illustrated) provided to a surface of the electronic pen 2, or the like are supplied from the electronic pen 2 to the computer 5 through the above-mentioned wireless communication devices R1 and R2. The computer 5 has functions of determining effects to be used in drawing (line widths, colors, transparency, etc.) based on the information (writing pressure, pen ID, on/off information regarding the switch, etc.) supplied from the electronic pen 2, and using the determined effects to draw, on an unillustrated display, characters or pictures in accordance with positions sequentially supplied from the digitizer 4. In addition, the computer 5 can generate ink data indicating drawing contents and store it in a storage device, and additionally can transmit the stored ink data to another unillustrated computer or the like using a communication apparatus.

The computer 5 performs operation for pairing with the electronic pen 2 before starting drawing based on positions supplied from the digitizer 4. For this pairing operation, the electronic pen 2 before being paired with any position detecting apparatus 3 transmits a pairing request including predetermined information using the wireless communication device R1 periodically. This predetermined information includes information to identify itself among a plurality of electronic pens 2 (hereinafter referred to as "identification information"). The identification information may be the above-mentioned pen ID, but may be other information such as a hash value of the pen ID or a portion thereof since the pen ID is information with a large size. Then, the computer 5 having received the pairing request transmits a predetermined response signal using the wireless communication device R2. A pairing connection between the computer 5 and the position detecting apparatus 3 is established in this manner by the computer 5 transmitting a response signal and the electronic pen 2 receiving the response signal. After having established a pairing connection, the computer 5 handles positions sequentially supplied from the digitizer 4 as positions of the electronic pen 2 with which it is paired, and executes the above-mentioned drawing operation.

Figure 2:
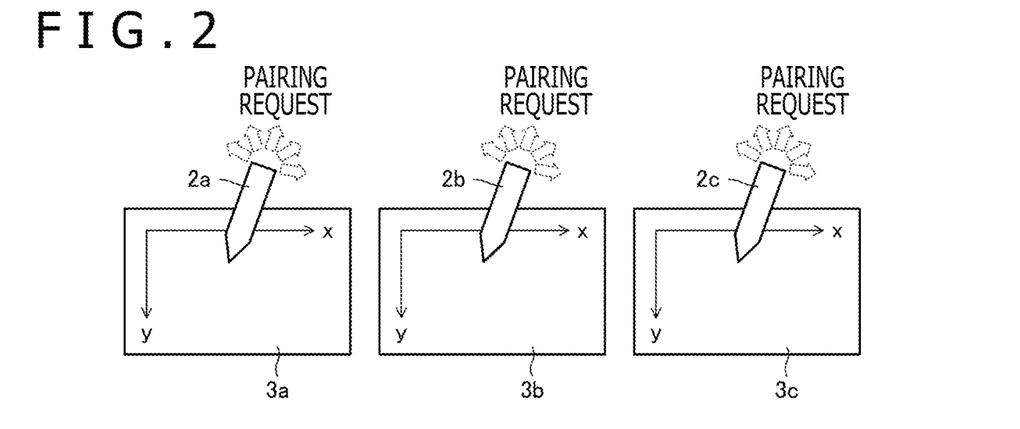
FIG. 2 is a figure for explaining pairing operations performed between a plurality of electronic pens and a plurality of position detecting apparatuses.

FIG. 2 is a figure for explaining pairing operations performed between a plurality of electronic pens 2 and a plurality of position detecting apparatuses 3. Although, in the figure, three electronic pens 2a to 2c and three position detecting apparatuses 3a to 3c are illustrated as one example, these numbers are not limited to three. In addition, the number of electronic pens 2 and the number of position detecting apparatuses 3 need not agree with each other.

As depicted in FIG. 2, in actual scenes of utilization, a plurality of electronic pens 2 and a plurality of position detecting apparatuses 3 are used at positions close to each other in some cases. In this case, an electronic pen 2 which is the transmitter of a pairing request received by a computer 5 of a position detecting apparatus 3 and an electronic pen 2 being actually manipulated by a user on a digitizer 4 of the position detecting apparatus 3 might not agree with each other. In such a case, if a pairing connection is established between the computer 5 and the electronic pen 2 which is the transmitter of the pairing request, this results in drawing operation not intended by the user being performed. A first object of the position detecting system 1 according to the present embodiment is to prevent occurrence of such unintended drawing operation, and the position detecting system 1 allows a user to perform pairing between an electronic pen 2 and a position detecting apparatus 3 expressly and with simple manipulation. This is explained in detail below.

Figure 3:
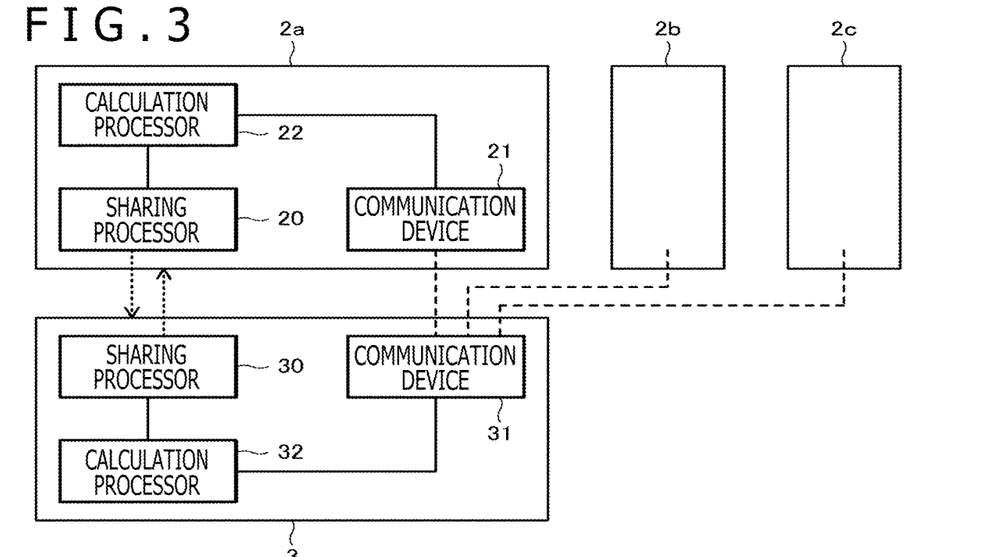
FIG. 3 is a simplified block diagram depicting functional blocks of an electronic pen and a position detecting apparatus according to a first embodiment of the present disclosure.

FIG. 3 is a simplified block diagram depicting functional blocks of the electronic pen 2 and the position detecting apparatus 3 according to a first embodiment of the present disclosure. As depicted in the figure, the electronic pen 2 (2a) includes a sharing processor 20 (first sharing processor), a communication device 21 (first communication device) and a calculation processor 22 (first calculation processor). Note that although, in the figure, these functional blocks are illustrated only for the electronic pen 2a among the electronic pen 2a to 2c, the electronic pens 2b and 2c also have similar functional blocks. In addition, the position detecting apparatus 3 includes a sharing processor 30 (second sharing processor), a communication device 31 (second communication device) and a calculation processor 32 (second calculation processor).

The sharing processor 20 is a functional unit that performs a process (sharing) for sharing, with the position detecting apparatus 3, predetermined sharing information that becomes sharable if the sharing processor 20 is proximate to the position detecting apparatus 3 (in particular, the digitizer 4) at and within a predetermined distance from it. In addition, the sharing processor 30 is a functional unit that performs a process (sharing) for sharing this sharing information with the electronic pen 2. In a specific example, the sharing information is information included in both first proximity information acquired by the electronic pen 2 and second proximity information acquired by the position detecting apparatus 3 (information representing changes in proximity), or information that one of the electronic pen 2 and the position detecting apparatus 3 transmits to the other by means of the second communication device (a pen ID, a local ID, etc.). The former is explained in second to fifth embodiments, and the latter is explained in sixth and seventh embodiments.

The communication device 21 is a communication device configured to be able to transmit and receive signals to and from the position detecting apparatus 3 by means of the above-mentioned first communication device, and specifically includes the wireless communication device R1 depicted in FIG. 1. Signals that the communication device 21 transmits to the position detecting apparatus 3 include the above-mentioned pairing request.

The calculation processor 22 is a functional unit configured to be able to control each component of the electronic pen 2, and specifically performs a process of causing the communication device 21 to transmit sharing information that the sharing processor 20 shares with the position detecting apparatus 3 periodically. More specifically, the calculation processor 22 causes the communication device 21 to transmit a pairing request including the sharing information periodically to thereby causes the communication device 21 to transmit the sharing information periodically.

The communication device 31 is a communication device configured to be able to transmit and receive signals to and from the electronic pen 2 by means of the above-mentioned first communication device, and specifically includes the wireless communication unit R2 depicted in FIG. 1. Signals that the communication device 31 receives from the electronic pen 2 include the pairing request including sharing information.

The calculation processor 32 is a functional unit configured to be able to control each component of the position detecting apparatus 3. Specifically, the calculation processor 32 uses sharing information shared with the electronic pen 2 by means of the sharing processor 30 to decide whether or not information received by the communication device 31 is information transmitted by the electronic pen 2 (decision). The calculation processor 32 performs this decision based on whether or not the information received by the communication device 31 includes the sharing information. Furthermore, if it is decided that the information (pairing request) received by the communication device 31 is information transmitted by the electronic pen 2 with which the position detecting apparatus 3 shares the sharing information by means of the sharing processor 30, the calculation processor 32 also performs a process of establishing a pairing connection with the electronic pen 2.

Figure 4:
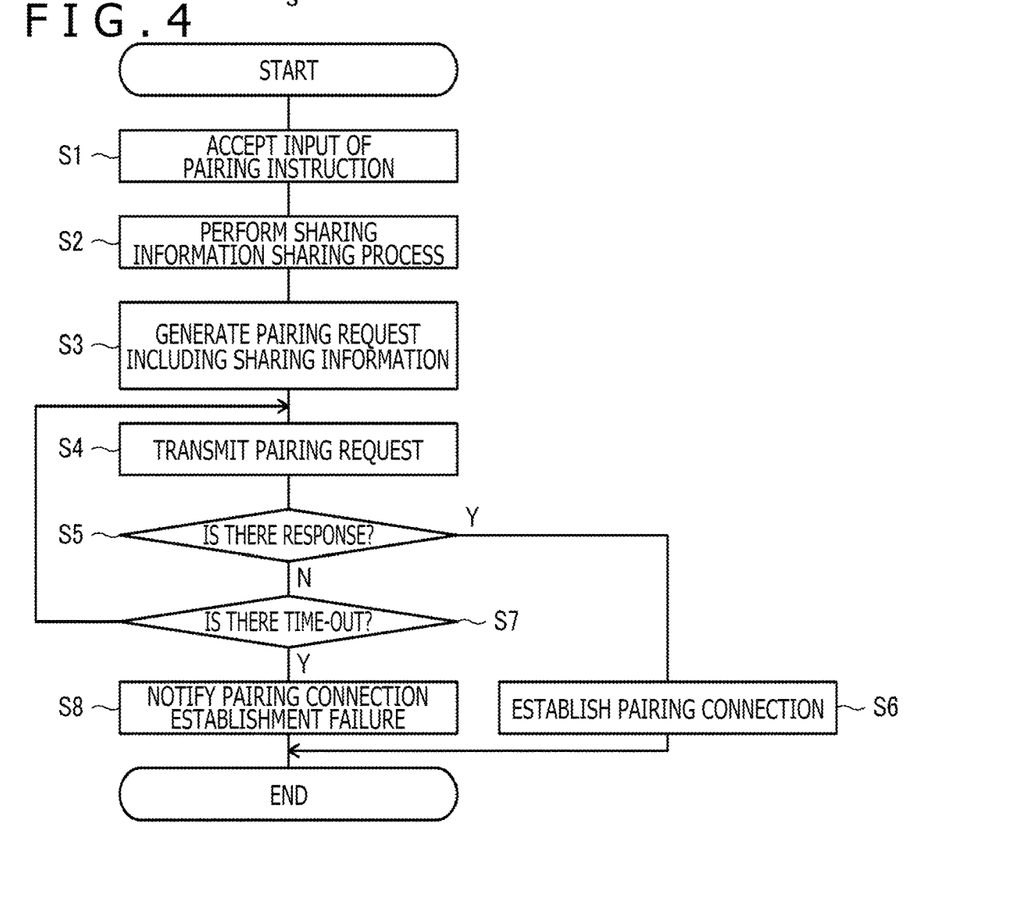
FIG. 4 is a process flow diagram depicting a process performed by a calculation processor depicted in FIG. 3.
Figure 5:
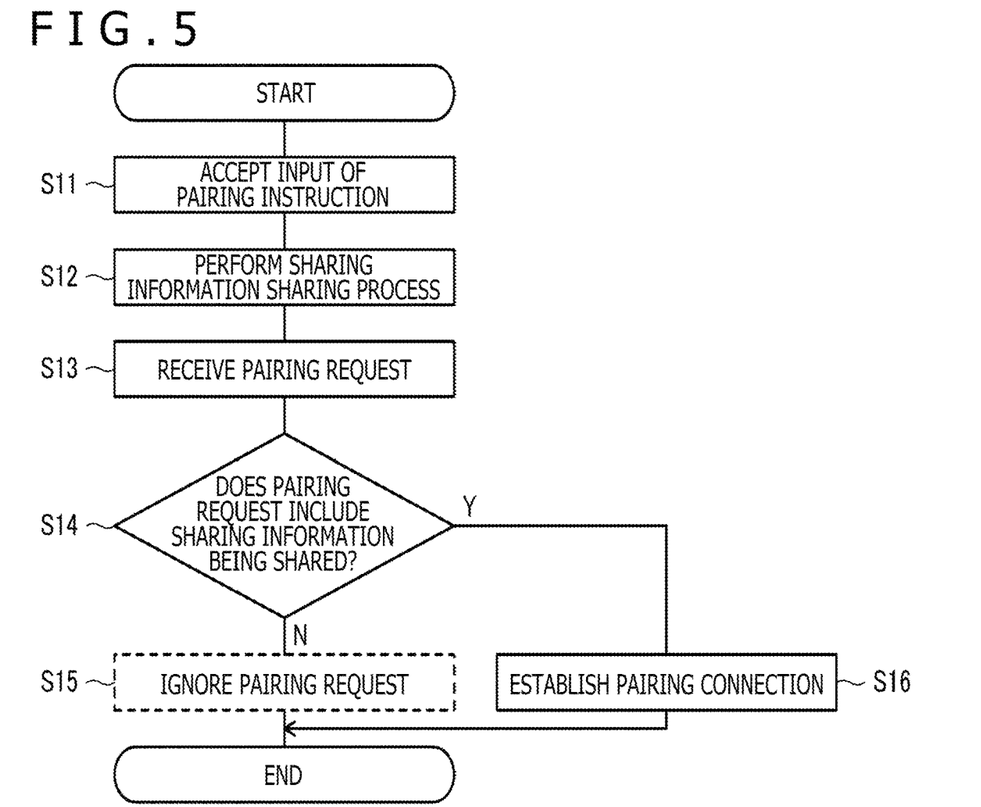
FIG. 5 is a process flow diagram depicting a process performed by a calculation processor depicted in FIG. 3.

FIG. 4 and FIG. 5 are process flow diagrams depicting processes performed by the calculation processors 22 and 32, respectively. Hereinafter, the processes performed by the calculation processing processors 22 and 32 for establishing a pairing connection between the electronic pen 2 and the position detecting apparatus 3 are explained in detail with reference to these figures.

First, the process on the electronic pen 2 side is explained with reference to FIG. 4. This process is triggered when the calculation processor 22 accepts input of a pairing instruction (S1). This input is realized by manipulation by a user of pressing a switch (not illustrated) provided to a side surface or an end portion of the electronic pen 2, for example.

The calculation processor 22 having accepted input of a pairing instruction next performs sharing information sharing process (S2). S2 is a process to be performed by cooperation between the sharing processors 20 and 30, and constitutes the sharing of the present disclosure along with S12 depicted in FIG. 5. As specific examples of the sharing process, for example in the second to fifth embodiments mentioned below, a process of sharing proximity change information by processes of the sensors 20a and 30a depicted in FIG. 6 corresponds to the sharing process. In addition, in the sixth embodiment mentioned below, a process of sharing a pen ID by processes of a signal supply detector 20ab and a linear electrode group 30aa depicted in FIG. 13 corresponds to the sharing process. Furthermore, in the seventh embodiment mentioned below, a process of sharing a local ID by processes of the signal supply detector 20ab and the linear electrode group 30aa depicted in FIG. 14 corresponds to the sharing process. Details are explained in each embodiment.

Then, the calculation processor 22 generates a pairing request including the sharing information shared at S2 (S3), and causes the communication device 21 to transmit the generated pairing request (S4). This results in the pairing request including the sharing information being transmitted by the above-mentioned first communication device.

After the pairing request is transmitted, the calculation processor 22 decides whether or not a response from the position detecting apparatus 3 is received by the communication device 21 (S5). As a result, if it is decided that there is a response, a pairing connection is established with the position detecting apparatus 3 that has transmitted the response (S6). On the other hand, if it is decided that there is not a response, it is decided whether or not a predetermined length of time has passed since the pairing request is first transmitted (that is, whether or not there is a time-out) (S7). If the predetermined length of time has not passed, the process returns to S6 and the pairing request is transmitted again, and if the predetermined length of time has passed, a user is notified of failure of establishment according to the pairing request (S8). This notification may be performed by turning on a light (not illustrated), in red, provided to the side surface of the electronic pen 2, for example.

Next, the process on the position detecting apparatus 3 side is explained with reference to FIG. 5. The process on the position detecting apparatus 3 side is also triggered when the calculation processor 32 accepts input of a pairing instruction (S11). This input is realized by input manipulation of a user at the computer 5 (see FIG. 1), for example. The calculation processor 32 having accepted input of a pairing instruction next performs a sharing information sharing process (S12). The details are the same as those explained with reference to 2 in FIG. 4.

Next, the calculation processor 32 receives a pairing request from the electronic pen 2 through the communication device 31 (S13), and decides whether or not the received pairing request includes sharing information being shared (S14). This decision process is nothing but a process (decision) of using shared sharing information to decide whether or not the information (pairing request) received by the first communication device is information transmitted by the electronic pen 2 with which the sharing information is shared in the process at S2 and S12. If it is decided as a result of the decision that the pairing request does not include the sharing information, the pairing request is ignored (S15). In this case, a pairing connection with the electronic pen 2a is not established.

On the other hand, if it is decided at S14 that the pairing request includes the sharing information being shared, the calculation processor 32 establishes a pairing connection with the electronic pen 2 that has transmitted the pairing request (S16). The process performed at S16 includes the process of transmitting a response to the electronic pen 2 explained at S5 in FIG. 4. As a result, a pairing connection is established at both the electronic pen 2 and the position detecting apparatus 3, and it becomes possible to perform communication by means of the first communication device between the electronic pen 2 and the position detecting apparatus 3.

As explained above, with the position detecting system 1, electronic pen 2 and position detecting apparatus 3 according to the present embodiment, the position detecting apparatus 3 shares, with the electronic pen 2 in advance, sharing information that becomes sharable when the electronic pen 2 and the position detecting apparatus 3 (in particular, the digitizer 4) are proximate to each other at or within a predetermined distance, and establishes a connection according to a pairing request with the electronic pen 2 depending on the pairing request including the sharing information. Accordingly, pairing between the electronic pen 2 and the position detecting apparatus 3 can be performed expressly and with simple manipulation of making sharing information shared.

Figure 6:
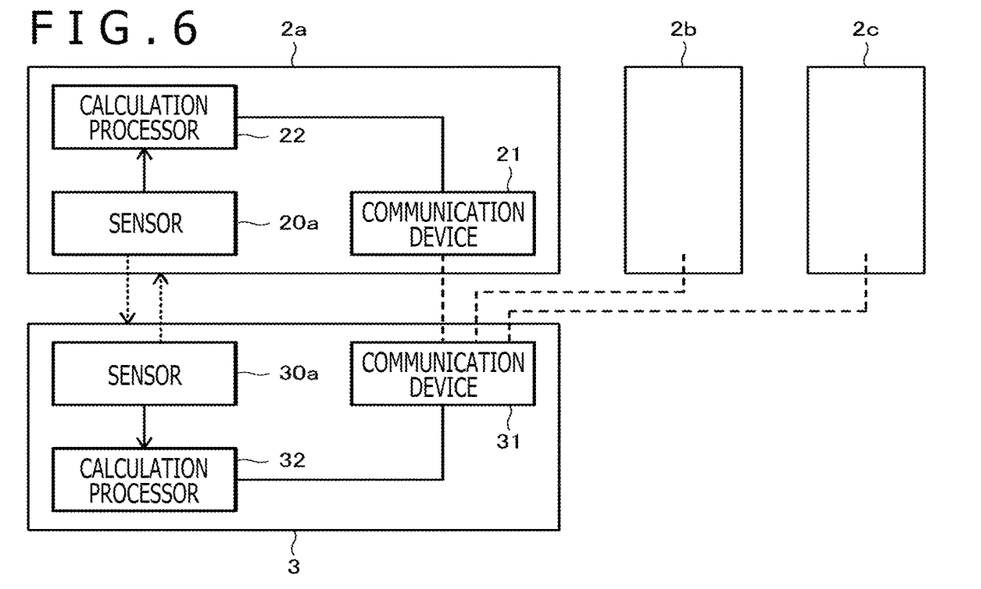
FIG. 6 is a simplified block diagram depicting functional blocks of the electronic pen and the position detecting apparatus according to a second embodiment of the present disclosure.

FIG. 6 is a simplified block diagram depicting functional blocks of the electronic pen 2 and the position detecting apparatus 3 according to the second embodiment of the present disclosure. The position detecting system 1 according to the present embodiment is different from the position detecting system 1 according to the first embodiment in that the sharing processor 20 is constituted by a sensor 20a (first sensor), and the sharing processor 30 is constituted by a sensor 30a (second sensor). The following explanation focuses on differences from the first embodiment.

The sensor 20a is a sensor to detect first proximity information indicating proximity to any object. In the present embodiment, this proximity change information is the above-mentioned sharing information, and the sensor 20a acquires the sharing information by acquiring this first proximity information. Proximity mentioned here includes one of or both the degree of proximity and presence or absence of contact. The object is not particularly limited, but preferably is a panel surface of the digitizer 4. In a specific example, the first proximity information is information indicating writing pressures detected by the electronic pen 2 or information indicating the reception intensity at the electronic pen 2 of uplink signals transmitted by the position detecting apparatus 3, and these are explained in the third and fourth embodiments, respectively.

The calculation processor 22 performs a process of acquiring first proximity information from the sensor 20a periodically, and serially causing the communication device 21 to transmit the acquired first proximity information. More specifically, the calculation processor 22 causes the communication device 21 to transmit a pairing request including the first proximity information periodically to thereby cause the communication device 21 to transmit the first proximity information periodically.

The sensor 30a is a sensor to detect second proximity information indicating proximity to any of a plurality of electronic pens 2. The sensor 30a acquires this second proximity information to thereby acquire sharing information which is proximity change information. Proximity mentioned here also includes one of or both the degree of proximity and presence or absence of contact. In a specific example, the second proximity information is information indicating the reception intensity at the digitizer 4 of downlink signals transmitted by the electronic pen 2 or information indicating the magnitude of capacitance formed between the sensor 30a and an electrode of the electronic pen 2, and these are explained in the fourth and fifth embodiments, respectively.

The calculation processor 32 performs: a process of retaining, in a time series, each of the first proximity information received by the communication device 31 and the second proximity information detected by the sensor 30a; a process of deciding whether or not the first and second proximity information that are retained in a time series agree with each other; and a process of establishing a pairing connection with the electronic pen 2 which is the transmitter of the first proximity information that is retained in a time series if it is decided that the first and second proximity information agree with each other.

Figure 7:
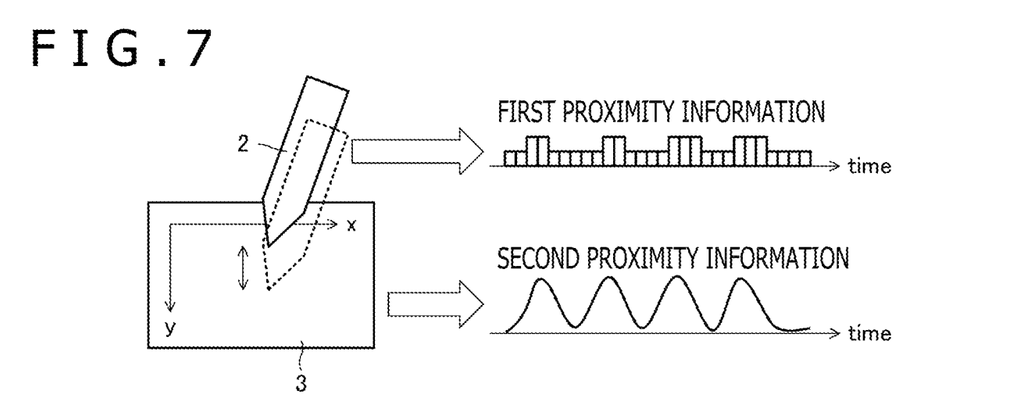
FIG. 7 is a figure depicting exemplary first proximity information transmitted by the electronic pen and exemplary second proximity information detected by the position detecting apparatus.
Figure 8:
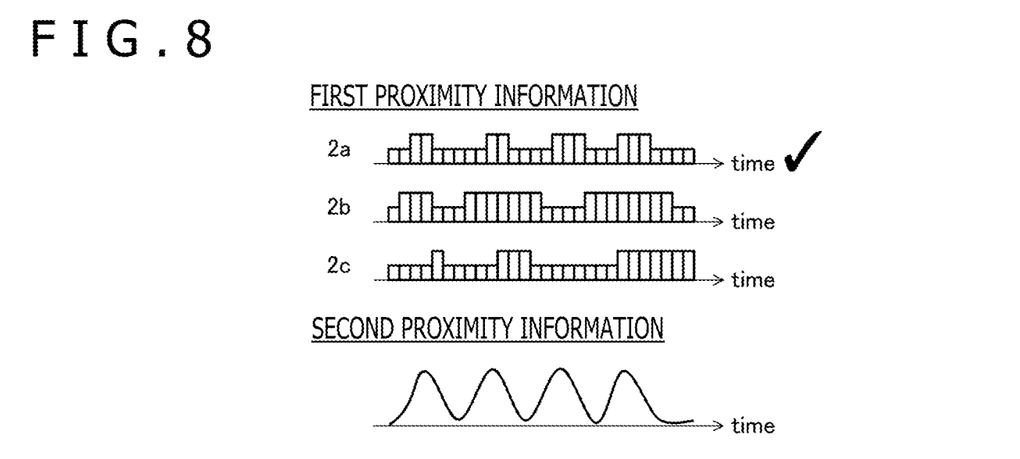
FIG. 8 is a figure for explaining a decision process performed by the calculation processor of the position detecting apparatus.

FIG. 7 is a figure depicting exemplary first proximity information transmitted by the electronic pen 2 and exemplary second proximity information detected by the position detecting apparatus 3. In addition, FIG. 8 is a figure for explaining a decision process performed by the calculation processor 32 of the position detecting apparatus 3. Hereinafter, the first and second proximity information, and processes of the calculation processor 32 are explained more specifically with reference to these figures.

As depicted in FIG. 7, the first proximity information is, in one example, binary information indicating high or low values, and is transmitted periodically along with periodical transmission of pairing requests. Note that although, in FIG. 7 in order to allow one to understand intuitively, the first proximity information is drawn as if it is constituted by binary signals, the actual first proximity information is one-bit information included in pairing requests.

On the other hand, the second proximity information is, in one example, analog signals indicating proximity to any of a plurality of electronic pens 2 with analog values. However, the second proximity information may be constituted by multiple values constituted by discrete values or binary digital signals.

In the example depicted in FIG. 6, since the three electronic pens 2a to 2c are present near the position detecting apparatus 3, the position detecting apparatus 3 receives a pairing request from each of these three electronic pens 2a to 2c. FIG. 8 illustrates first proximity information included in each of the thus-received three pairing requests. The position detecting apparatus 3 refers to the above-mentioned identification information included in the pairing request received from each of the electronic pens 2a to 2c to thereby identify first proximity information of each of the electronic pens 2a to 2c.

Here, transmission of pairing requests is suitably performed using frequency division, for example. More specifically, the electronic pen 2 suitably transmits a pairing request by randomly selecting one frequency from a predetermined plurality of frequencies every time it is to transmit a pairing request, and performing amplitude modulation on a carrier signal of the selected frequency. This is because, by doing so, it becomes possible to avoid collision of pairing requests transmitted from individual ones among a plurality of electronic pens 2 to some extent.

Comparison, in a time series, between changes in proximity indicated by each of three pieces of first proximity information depicted in FIG. 8 and changes in proximity indicated by second proximity information detected in the same period as those three pieces of the first proximity information reveals that only the first proximity information of the electronic pen 2a agrees with the second proximity information. The calculation processor 32 establishes a pairing connection with the electronic pen 2a according to detection of such an agreement between the proximity information (that is, positive decision at S14 in FIG. 5) (S16 in FIG. 5). In contrast, in the example of FIG. 8, the first proximity information of the electronic pens 2b and 2c do not agree with the second proximity information. Accordingly, since a decision result at S14 in FIG. 5 is negative, the calculation processor 32 does not perform pairing with the electronic pens 2b and 2c (S15 in FIG. 5).

An agreement of proximity information like the one in the example depicted in FIG. 8 means that timing at which the electronic pen 2a approached (or contacted) any object and timing at which it is separated from the object agree with timing at which the position detecting apparatus 3 approached (or contacted) any electronic pen 2 and timing at which it is separated from the electronic pen 2 in a comparison target period. Such an agreement can be produced artificially. Specifically, a user only has to tap the panel surface of the digitizer 4 of the position detecting apparatus 3 that he/she wishes to establish a pairing connection several times, for example, using the electronic pen 2 that has not established a pairing connection with any position detecting apparatus 3 yet. To put it conversely, the above-mentioned state of an agreement can be produced artificially by such tapping. Accordingly, it can be said that, according to the present embodiment, pairing between the electronic pen 2 and the position detecting apparatus 3 is realized by a user expressly and with simple manipulation.

As explained above, the position detecting system 1, electronic pen 2 and position detecting apparatus 3 according to the present embodiment allow a user to establish a pairing connection between the electronic pen 2 and the position detecting apparatus 3, for example, by bringing the electronic pen 2 close to the position detecting apparatus 3 and separating the electronic pen 2 from the position detecting apparatus 3 several times (more specifically, by tapping several times) and so on. Accordingly, pairing between the electronic pen 2 and the position detecting apparatus 3 can be performed expressly and with simple manipulation.

Figure 9:
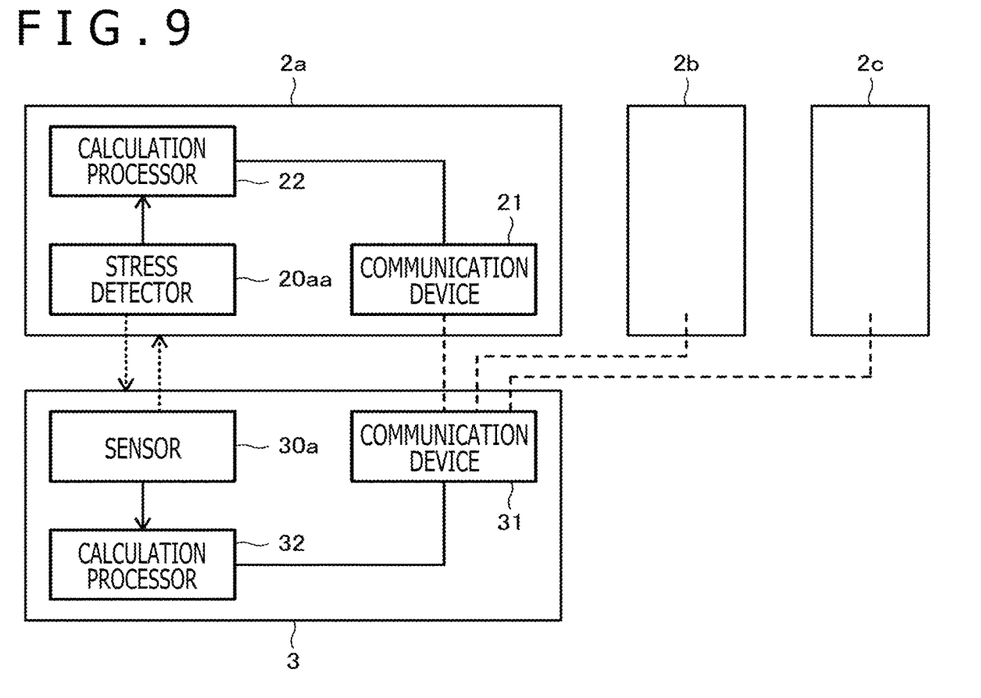
FIG. 9 is a simplified block diagram depicting functional blocks of the electronic pen and the position detecting apparatus according to a third embodiment of the present disclosure.

FIG. 9 is a simplified block diagram depicting functional blocks of the electronic pen 2 and the position detecting apparatus 3 according to the third embodiment of the present disclosure. The position detecting system 1 according to the present embodiment is different from the position detecting system 1 according to the second embodiment in that the sensor 20a is constituted by a stress detector 20aa. The following explanation focuses on differences from the second embodiment.

The stress detector 20aa is a sensor to detect a stress (writing pressure) applied to the tip of an electronic pen 2, and specifically is constituted by a variable capacitor, a strain gauge sensor or the like. The above-mentioned stress is normally applied to the pen point from the panel surface of the digitizer 4.

The stress detected by the stress detector 20aa can be said to be information that indicates proximity between the electronic pen 2 and any object (specifically, presence or absence of contact with the panel surface of the position detecting apparatus 3). In view of this, the calculation processor 22 according to the present embodiment acquires, as the first proximity information, information indicating a stress detected by the stress detector 20aa. Processes that follow thereafter are similar to those in the second embodiment.

As explained above, the position detecting system 1, electronic pen 2 and position detecting apparatus 3 according to the present embodiment make it possible to utilize, as the first proximity information, information indicating a stress applied to the tip of the electronic pen 2.

Figure 10:
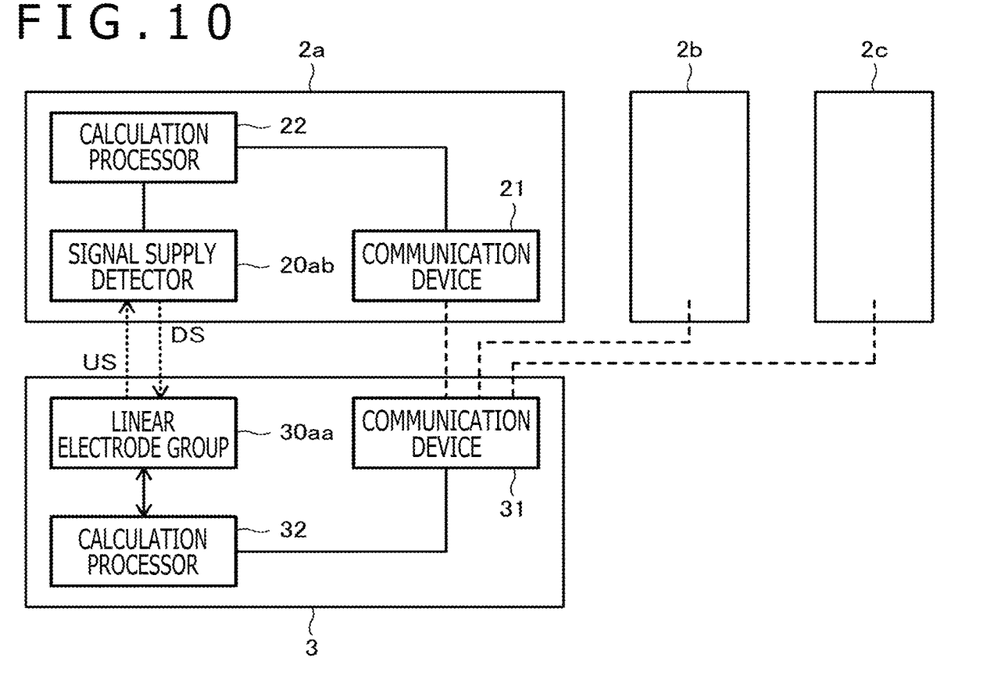
FIG. 10 is a simplified block diagram depicting functional blocks of the electronic pen and the position detecting apparatus according to a fourth embodiment of the present disclosure.

FIG. 10 is a simplified block diagram depicting functional blocks of the electronic pen 2 and the position detecting apparatus 3 according to the fourth embodiment of the present disclosure. The position detecting system 1 according to the present embodiment is different from the position detecting system 1 according to the second embodiment in that the sensor 20a is constituted by a signal supply detector 20ab and that the sensor 30a is constituted by a linear electrode group 30aa. The following explanation focuses on differences from the second embodiment. Note that although, in the example explained here, the sensor 30a is constituted by the linear electrode group 30aa, the sensor 30a may certainly be constituted by a group of electrodes with shaped other than linear forms.

As mentioned above, the linear electrode group 30aa includes a plurality of linear electrodes arranged in parallel with the x axis and at constant intervals and a plurality of linear electrodes arranged in parallel with the y axis and at constant intervals. The calculation processor 32 according to the present embodiment transmits uplink signals US to the electronic pen 2 by means of the above-mentioned second communication device by utilizing the linear electrode group 30aa as transmitting electrodes, and additionally receives downlink signals DS from the electronic pen 2 by means of the second communication device by utilizing the linear electrode group 30aa as receiving electrodes. The uplink signals US are signals including information indicating commands to the electronic pen 2, for example. In addition, the downlink signals DS are signals including burst signals for positional detection. The calculation processor 32 can detect the position of the electronic pen 2 on the panel surface by detecting the reception intensity of the burst signal at each linear electrode.

The signal supply detector 20ab includes a resonance circuit configured to capacitively couple with the linear electrode group 30aa. The signal supply detector 20ab receives uplink signals US by the capacitive coupling and supplies the uplink signals US to the calculation processor 22, and additionally generates operating power of the electronic pen 2 from the received uplink signals US. The calculation processor 22 utilizes the thus-generated power to transmit downlink signals DS by the above-mentioned capacitive coupling.

Figure 11:
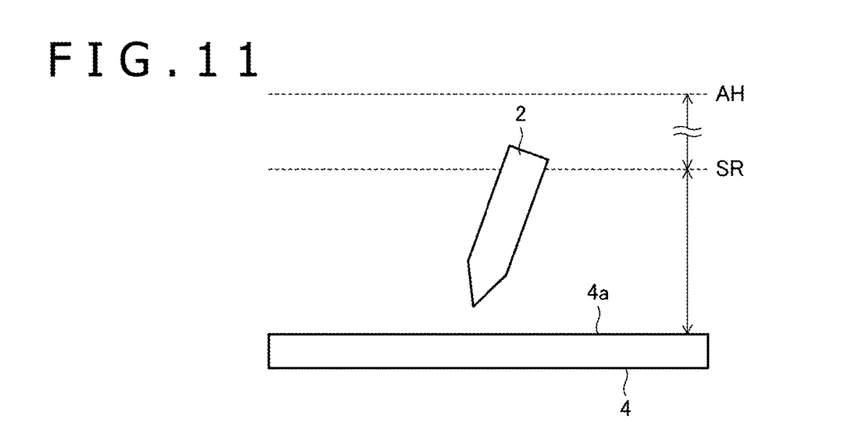
FIG. 11 is a figure for explaining the ranges of a downlink signal and an uplink signal depicted in FIG. 10.

FIG. 11 is a figure for explaining the ranges of downlink signals DS and uplink signals US. A sensing range SR and an uplink detection height AH indicated with broken lines in the figure each indicate a distance from a panel surface 4a of the digitizer 4 in the height direction.

The sensing range SR is the range in which the linear electrode group 30aa can receive downlink signals DS. This means that in order for the position detecting apparatus 3 to receive downlink signals DS transmitted by the electronic pen 2, the electronic pen 2 needs to be so close to the panel surface 4a of the digitizer 4 that the downlink signals DS can reach the linear electrode group 30aa.

The uplink detection height AH indicates the extent of height (distance from the panel surface 4a) at which the signal supply detector 20ab can receive uplink signals US. Generally, the uplink detection height AH is located at a place higher than the upper limit of the sensing range SR (a place apart from the panel surface 4a). This is due to the difference between the transmission intensities of uplink signals US and downlink signals DS. Generally, the state where the electronic pen 2 is lower than the uplink detection height AH, but not in contact with the panel surface 4a is called "the hovering state," and the state where the electronic pen 2 is in contact with the panel surface 4a is called "the contacting state."

Retuning to FIG. 10, the reception intensity of uplink signals US at the signal supply detector 20ab can be said to be information indicating proximity between the electronic pen 2 and any object (specifically, the degree of proximity to the linear electrode group 30aa). In view of this, the calculation processor 22 according to the present embodiment acquires the reception intensity of uplink signals US at the signal supply detector 20ab as the first proximity information. In addition, the reception intensity of downlink signals DS at the linear electrode group 30aa can be said to be information indicating proximity between the position detecting apparatus 3 and any electronic pen 2 (specifically, the degree of proximity to the signal supply detector 20ab). In view of this, the calculation processor 32 according to the present embodiment acquires the reception intensity of downlink signals DS at the linear electrode group 30aa as the second proximity information. Processes that follow thereafter are similar to those in the second embodiment.

As explained above, the position detecting system 1, electronic pen 2 and position detecting apparatus 3 according to the present embodiment make it possible to utilize, as the first proximity information, information indicating the reception intensity of uplink signals US at the electronic pen 2, and additionally to utilize, as the second proximity information, information indicating the reception intensity of downlink signals DS at the position detecting apparatus 3.

Figure 12:
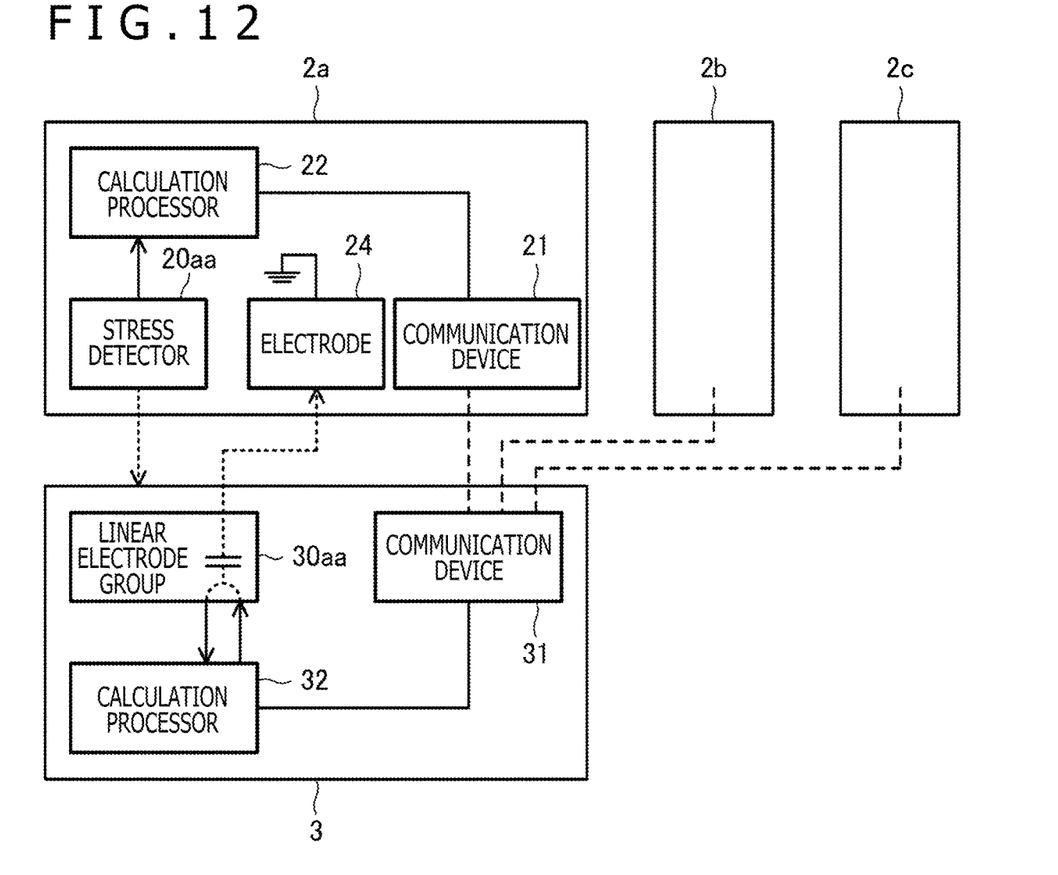
FIG. 12 is a simplified block diagram depicting functional blocks of the electronic pen and the position detecting apparatus according to a fifth embodiment of the present disclosure.

FIG. 12 is a simplified block diagram depicting functional blocks of the electronic pen 2 and the position detecting apparatus 3 according to the fifth embodiment of the present disclosure. The position detecting system 1 according to the present embodiment is different from the position detecting system 1 according to the third embodiment in that the sensor 30a is constituted by the linear electrode group 30aa, and the magnitude of capacitance between an electrode 24 of the electronic pen 2 and the linear electrode group 30aa is utilized as the second proximity information. The following explanation focuses on differences from the third embodiment.

The electrode 24 is an electrode provided to the pen point of the electronic pen 2. If the electronic pen 2 is gripped by a user, the electrode 24 is grounded through the housing of the electronic pen 2 and the human body.

Similar to the fourth embodiment, the linear electrode group 30aa includes a plurality of linear electrodes (hereinafter, referred to as x electrodes) arranged in parallel with the x axis and at constant intervals and a plurality of linear electrodes (hereinafter, referred to as y electrodes) arranged in parallel with the y axis and at constant intervals. However, the calculation processor 32 according to the present embodiment transmits predetermined signals, for example, using the plurality of x electrodes as transmitting electrodes sequentially, and receives the predetermined signals using the plurality of y electrodes as receiving electrodes sequentially. Since those predetermined signals are signals also used to detect finger touches, they are referred to as touch detection signals hereinafter.

If, when an x electrode is transmitting a touch detection signal to a y electrode, the electrode 24 of the electronic pen 2 is present close to an intersection point therebetween, part of a current flowing therebetween flows into a grounded end through the electrode 24. As a result, the reception intensity of a touch detection signal detected by the calculation processor 32 lowers.

The magnitude of the reception intensity of a touch detection signal detected by the calculation processor 32 is proportional to the magnitude of the capacitance formed between the electrode 24 and the linear electrode group 30aa. Then, the capacitance increases as the distance between the electrode 24 and the panel surface decreases. Accordingly, the magnitude of the reception intensity of a touch detection signal can be said to be information indicating proximity between the position detecting apparatus 3 and any electronic pen 2 (specifically, the degree of proximity to the electrode 24). In view of this, the calculation processor 32 according to the present embodiment acquires, as the second proximity information, information indicating the magnitude of the reception intensity of touch detection signals, that is, the magnitude of the capacitance formed between the electrode 24 and the linear electrode group 30aa. Processes that follow thereafter are similar to those in the second embodiment.

As explained above, the position detecting system 1, electronic pen 2 and position detecting apparatus 3 according to the present embodiment make it possible to utilize, as the second proximity information, information indicating the magnitude of the reception intensity of touch detection signals, that is, the magnitude of the capacitance formed between the electrode 24 and the linear electrode group 30aa.

Figure 13:
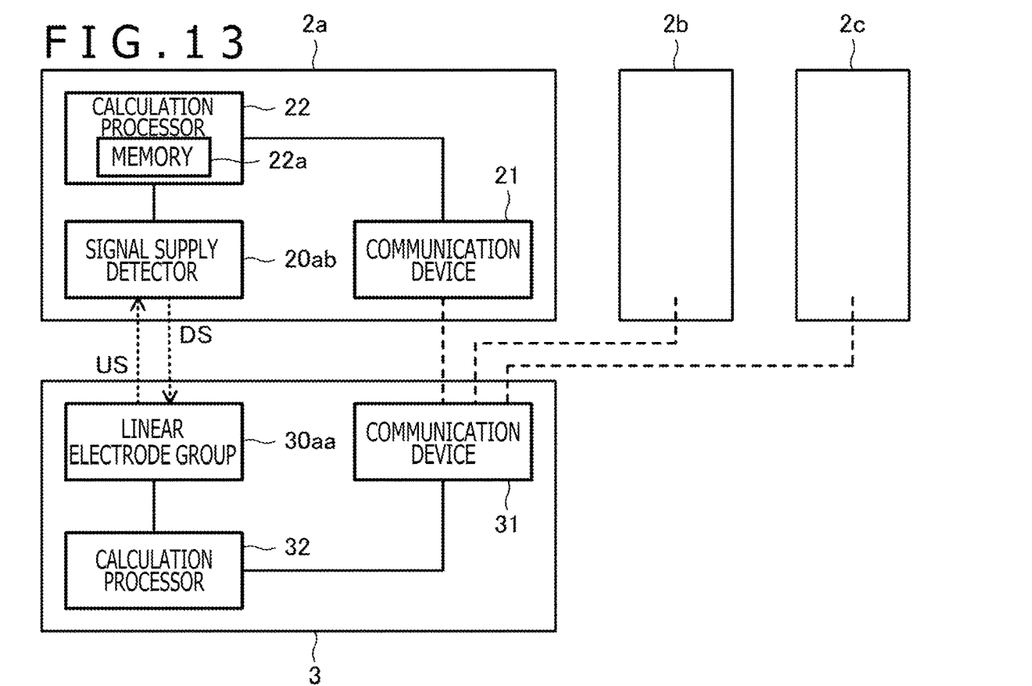
FIG. 13 is a simplified block diagram depicting functional blocks of the electronic pen and the position detecting apparatus according to a sixth embodiment of the present disclosure.

FIG. 13 is a simplified block diagram depicting functional blocks of the electronic pen 2 and the position detecting apparatus 3 according to the sixth embodiment of the present disclosure. The figure is the same as FIG. 10 except that the memory 22a (first memory) is clearly depicted in the calculation processor 22. Note that the memory 22a is always provided in the calculation processor 22, but illustration of it is omitted in other figures including FIG. 10.

The position detecting system 1 according to the present embodiment is different from the fourth embodiment explained with reference to FIG. 10 in terms of contents of sharing information and sharing methods. The following explanation focuses on differences from the fourth embodiment.

In the present embodiment, electronic pens 2 can be identified uniquely, and additionally information stored in advance in a memory 22a of each electronic pen 2 is used as sharing information. Specific examples of such information include the above-mentioned pen ID. Although, in the following explanation, it is presumed that the pen ID is used as sharing information, the explanation also applies to cases where information other than the pen ID is used as sharing information.

The processes of sharing the sharing information performed at S2 in FIG. 4 and at S12 in FIG. 5 are realized using downlink signals DS in the present embodiment. Explaining specifically, the signal supply detector 20ab performs a process of transmitting a pen ID stored in the memory 22a using a downlink signal DS. In addition, the linear electrode group 30aa performs a process of receiving a pen ID using a downlink signal DS. Processes performed after the sharing information is shared in this manner are the same as those explained in the first embodiment.

As explained above, the position detecting system 1, electronic pen 2 and position detecting apparatus 3 according to the present embodiment make it possible to use, as the sharing information, information which can uniquely identify electronic pens 2 like pen IDs and additionally is retained in advance by each electronic pen 2.

Figure 14:
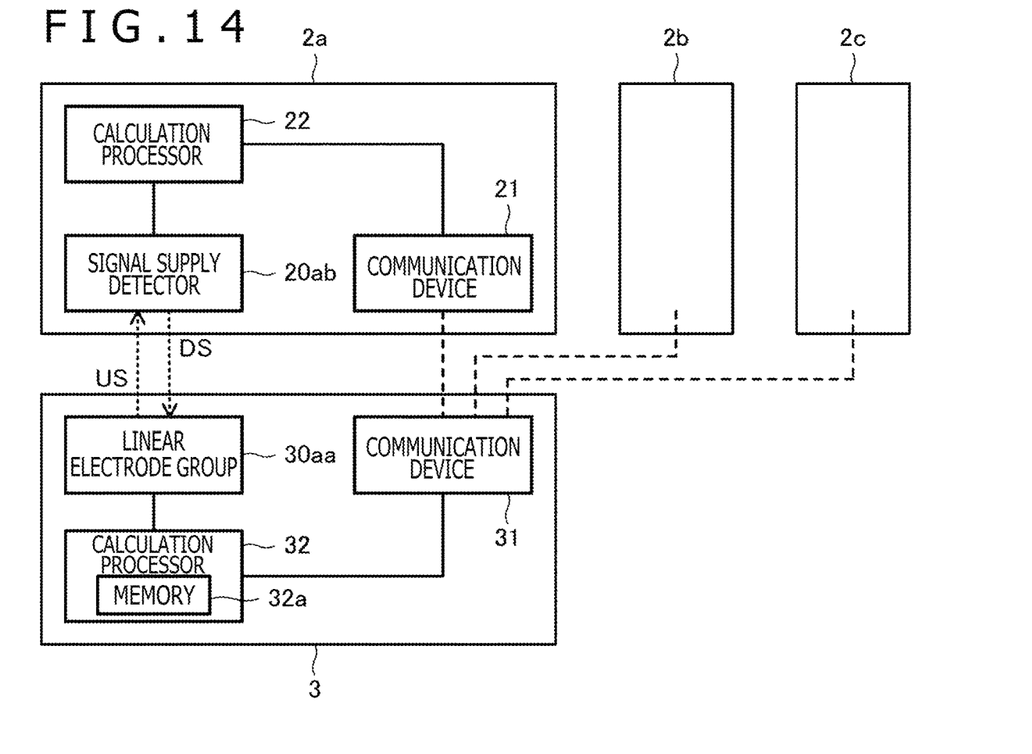
FIG. 14 is a simplified block diagram depicting functional blocks of the electronic pen and the position detecting apparatus according to a seventh embodiment of the present disclosure.

FIG. 14 is a simplified block diagram depicting functional blocks of the electronic pen 2 and the position detecting apparatus 3 according to the seventh embodiment of the present disclosure. The figure is the same as FIG. 10 except that the memory 32*a* (second memory) is clearly depicted in the calculation processor 32. Note that the memory 32*a* is always provided in the calculation processor 32, but illustration of it is omitted in other figures including FIG. 10.

The position detecting system 1 according to the present embodiment is also different from the fourth embodiment explained with reference to FIG. 10 in terms of contents of sharing information and sharing methods. The following explanation focuses on differences from the fourth embodiment.

In the present embodiment, local IDs generated in advance by the calculation processor 32 and stored in the memory 32*a* are used as sharing information. The local IDs are numerical information having several bits, for example. The calculation processor 32 selects, as sharing information, one of multiple local IDs stored in the memory 32*a*. If a pairing connection is established with an electronic pen 2, the calculation processor 32 excludes a local ID being shared with the electronic pen 2 from selection candidates, and selects another local ID.

The processes of sharing the sharing information performed at S2 in FIG. 4 and at S12 in FIG. 5 are realized using uplink signals US in the present embodiment. Explaining specifically, the linear electrode group 30*aa* performs a process of transmitting, using an uplink signal US, one which is among the multiple local IDs stored in the memory 32*a* and is selected by the calculation processor 32. In addition, the signal supply detector 20*ab* performs a process of receiving a local ID using an uplink signal US. Processes performed after the sharing information is shared in this manner are the same as those explained in the first embodiment.

As explained above, the position detecting system 1, electronic pen 2 and position detecting apparatus 3 according to the present embodiment make it possible to use, as the sharing information, local IDs generated by the calculation processor 32.

Figure 15:
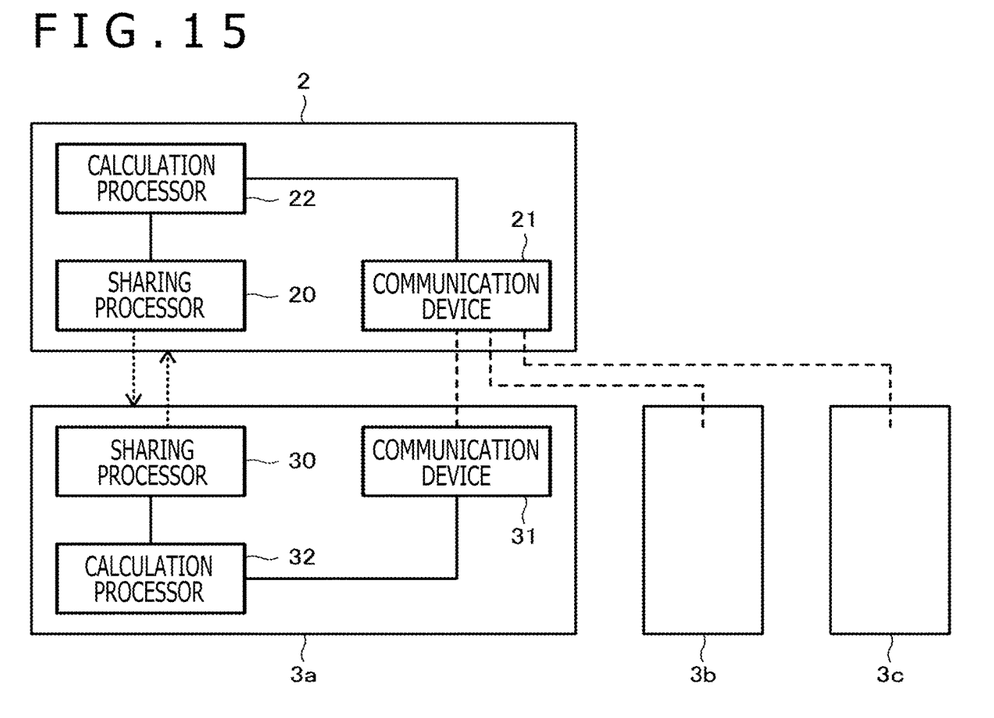
FIG. 15 is a simplified block diagram depicting functional blocks of the electronic pen and the position detecting apparatus according to an eighth embodiment of the present disclosure.

FIG. 15 is a simplified block diagram depicting functional blocks of the electronic pen 2 and the position detecting apparatus 3 according to an eighth embodiment of the present disclosure. The present embodiment is different from the first to seventh embodiments in that transmission of a pairing request is performed not by the electronic pen 2, but by the position detecting apparatus 3. Contents of sharing information and sharing methods may be similar to those explained in the first to seventh embodiments. The following explanation focuses on differences from the first embodiment.

The calculation processor 32 according to the present embodiment performs a process of causing the communication device 31 to transmit sharing information that the sharing processor 30 shares with the electronic pen 2 periodically. More specifically, the calculation processor 32 causes the communication device 31 to transmit a pairing request including the sharing information periodically to thereby cause the communication device 31 to transmit the sharing information periodically.

The calculation processor 22 according to the present embodiment uses sharing information shared with the position detecting apparatus 3 by means of the sharing processor 20 to decide whether or not information received by the communication device 21 is information transmitted by the position detecting apparatus 3. The calculation processor 22 performs this decision based on whether or not the information received by the communication unit 21 includes the sharing information. Furthermore, if it is decided that the information (pairing request) received by the communication device 21 is information transmitted by the position detecting apparatus 3 with which the electronic pen 2 shares the sharing information by means of the sharing processor 20, the calculation processor 22 also performs a process of establishing a pairing connection with the position detecting apparatus 3.

In short, in the present embodiment, the series of processes depicted in FIG. 4 is performed by the calculation processor 32 of the position detecting apparatus 3, and the series of processes depicted in FIG. 5 is executed by the calculation processor 22 of the electronic pen 2. Accordingly, according to the present embodiment also, similar to the first to seventh embodiments, a pairing connection is established at both the electronic pen 2 and the position detecting apparatus 3, and it becomes possible to execute communication by means of the first communication device between the electronic pen 2 and the position detecting apparatus 3.

Here, if the electronic pen 2 and position detecting apparatus 3 according to the present embodiment perform operations similar to the sixth embodiment, a sensor ID is suitably used as sharing information instead of a pen ID. The sensor ID is information to uniquely identify the position detecting apparatus 3, and is stored in advance in a memory in a calculation processor 32 of each position detecting apparatus 3. Sharing of the sharing information in this case can be performed by the sharing processor 30 transmitting the sensor ID stored in the memory 32*a* in the calculation processor 32 using an uplink signal US and the sharing processor 20 receiving the thus-transmitted sensor ID.

As explained above, with the position detecting system 1, electronic pen 2 and position detecting apparatus 3 according to the present embodiment, the electronic pen 2 shares, with the position detecting apparatus 3 in advance, sharing information that becomes sharable when the electronic pen 2 and the position detecting apparatus 3 (in particular, the digitizer 4) are proximate to each other at or within a predetermined distance, and establishes a connection according to a pairing request with the position detecting apparatus 3 depending on the pairing request including the sharing information. Accordingly, according to the present embodiment also, pairing between the electronic pen 2 and the position detecting apparatus 3 can be performed expressly and with simple manipulation of making sharing information shared.

Although preferred embodiments of the present disclosure are explained above, the present disclosure is not in any way limited to those embodiments, and the present disclosure can certainly be implemented in various manners within the scope not deviating from main parts thereof.

For example, although in the above-mentioned embodiments, the digitizer 4 and the computer 5 are explained as being separate apparatuses, the present disclosure can suitably be applied to a so-called tablet computer that includes both of them integrally.

In addition, although, for example in the example explained in the fourth embodiment, information indicating the reception intensity of uplink signals US at the electronic pen 2 is utilized as the first proximity information, and additionally information indicating the reception intensity of downlink signals DS at the position detecting apparatus 3 is utilized as the second proximity information, in this example, only the first proximity information may be replaced by information indicating a stress applied to the tip of the electronic pen 2 as explained in the third embodiment, or only the second proximity information may be replaced with information indicating the magnitude of the capacitance formed between the electrode 24 and the linear electrode group 30aa as explained in the fifth embodiment.

In addition, after a pairing connection is established utilizing shared sharing information, one of or both the electronic pen 2 and the position detecting apparatus 3 may include the sharing information in a signal to be transmitted by the second communication device (specifically, an uplink signal US or a downlink signal DS). However, if the size of the sharing information is large or in other cases, information related to the sharing information, for example a hash value, may be included, instead of the sharing information. In this case, the electronic pen 2 and the position detecting apparatus 3 preferably acquire (calculate) the related information inside themselves individually.

Then, when having received a signal by means of the second communication device, based on whether or not information obtained by decoding (reception information) includes the sharing information or the information related to it, one of or both the electronic pen 2 and the position detecting apparatus 3 may decide whether or not the transmitter of the reception information is a partner apparatus with which it or they is/are sharing the sharing information. In this manner, it becomes possible for the electronic pen 2 and the position detecting apparatus 3 to continue communication by means of the second communication device with a partner apparatus with which they are sharing the sharing information, without confounding signals with those transmitted by apparatuses with which they are not sharing the sharing information.

In addition, the present disclosure can also be configured as in implementation 1 to implementation 7 indicated below.

[Implementation 1]
  A position detecting system including:
  a position detecting apparatus; and
  a plurality of position indicators,
  wherein each of the plurality of position indicators includes:
    a first sensor which, in operation, detects first proximity information indicating proximity to an object,
    a transmitter, and
    a first processor which, in operation, periodically acquires the first proximity information from the first sensor, and serially causes the transmitter to transmit the acquired first proximity information, and
  wherein the position detecting apparatus includes
    a second sensor which, in operation, detects second proximity information indicating proximity to any of the plurality of position indicators,
    a communication device which, in operation, receives the first proximity information, and
    a second processor which, in operation, retains the first proximity information received by the communication device and the second proximity information detected by the second sensor each in a time series, determines whether the first and second proximity information retained in the time series agree with each other, and if the second processor determines that the first and second proximity information agree with each other, the second processor establishes a pairing connection with a position indicator among the plurality of position indicators which is a transmitter of the first proximity information retained in the time series.

[Implementation 2]
  The position detecting system according to implementation 1, in which the first proximity information indicates a stress applied to a tip of the position indicator.

[Implementation 3]
  The position detecting system according to implementation 1, wherein:
    the second processor, in operation, transmits an uplink signal via the second sensor,
    each of the plurality of position indicators further includes a signal supply detector which, in operation, receives the uplink signal through capacitive coupling with the second sensor, and
    the first proximity information indicates a reception intensity of the uplink signal at the signal supply detector.

[Implementation 4]
  The position detecting system according to implementation 3, in which
    the signal supply detector, in operation, transmits a downlink signal through capacitive coupling with the second sensor, and
    the second proximity information indicates a reception intensity of the downlink signal at the second sensor.

[Implementation 5]
  The position detecting system according to implementation 1 or 2, wherein:
    each of the plurality of position indicators further includes a signal supply detector, in operation, transmits a downlink signal through capacitive coupling with the second sensor, and
    the second proximity information indicates a reception intensity of the downlink signal at the second sensor.

[Implementation 6]
  The position detecting system according to implementation 1 or 2, wherein:
    each of the plurality of position indicators further includes an electrode which, in operation, capacitively couples with the second sensor, and
    the second proximity information indicates a magnitude of capacitance formed between the second sensor and the electrode.

[Implementation 7]
  The position detecting system according to any one of implementations 1 to 6, wherein the first processor, in operation, causes the transmitter to periodically transmit a pairing request including the first proximity information to cause the transmitter to periodically transmit the first proximity information.

What is claimed is:
1. A pairing method between a stylus and a position detecting apparatus that detects a position pointed to by the stylus, the method comprising:
  transmitting, by the position detecting apparatus, an identifier (ID) to the stylus using a second wireless communication device of the position detecting apparatus while the stylus and the position detecting apparatus are proximate to each other at or within a predetermined distance, the ID uniquely identifying the position detecting apparatus; and
  establishing, by the stylus and the position detecting apparatus, a pairing connection between the stylus and the position detecting apparatus in response to the stylus receiving a pairing connection request including information including the ID via a first wireless communication device of the stylus having a communication range that is longer than the predetermined distance, wherein a communication range of the second wireless communication device of the position detecting apparatus is shorter than the communication range of the first wireless communication device of the stylus.

2. The pairing method according to claim 1, wherein the establishing includes determining whether the information transmitted via the first wireless communication device includes the ID.

3. The pairing method according to claim 1, further comprising:
receiving, by the stylus, the ID.

4. The pairing method according to claim 3, further comprising:
periodically transmitting, by the stylus, a pairing request including the ID using the first wireless communication device.

5. The pairing method according to claim 4, comprising:
after the pairing connection is established, based on whether reception information transmitted via the second wireless communication device includes information related to the ID transmitted by the transmitting, determining, by the position detecting apparatus, whether a transmitter of the reception information is the stylus.

6. The pairing method according to claim 5, wherein the information related to the ID is a hash value of the ID.

7. The pairing method according to claim 3, wherein the transmitting includes:
transmitting, by the position detecting apparatus, the ID using an uplink signal transmitted from the second wireless communication device to the stylus.

8. A position detecting system comprising:
a stylus; and
a position detecting apparatus that detects a position pointed to by the stylus,
wherein the stylus includes:
a first wireless communication device which, in operation, performs communication at a communication range that is longer than a predetermined distance, and
wherein the position detecting apparatus includes:
a second processor which, in operation, shares an identifier (ID) that is included in an uplink signal transmitted to the stylus while the stylus and the position detecting apparatus are proximate to each other at or within the predetermined distance, the ID uniquely identifying the position detecting apparatus, and a second wireless communication device which, in operation, performs communication with the first wireless communication device,
wherein a communication range of the second wireless communication device of the position detecting apparatus is shorter than the communication range of the first wireless communication device of the stylus,
wherein the stylus includes a first processor which, in operation, establishes a pairing connection with the position detecting apparatus in response to the first wireless communication device receiving a pairing connection request including information including the ID from the position detecting apparatus.

9. The position detecting system according to claim 8, wherein the first processor, in operation, determines whether the information received by the first wireless communication device includes the ID.

10. The position detecting system according to claim 8, wherein the second processor, in operation, causes the second wireless communication device to periodically transmit the ID.

11. The position detecting system according to claim 10, wherein the first processor, in operation, establishes the pairing connection with the position detecting apparatus in response to the first processor determining that the information received by the first wireless communication device is transmitted by the position detecting apparatus.

12. The position detecting system according to claim 8, wherein the first processor, in operation:
establishes the pairing connection with the position detecting apparatus in response to the first processor determining that the information received by the first wireless communication device is transmitted by the position detecting apparatus.

13. The position detecting system according to claim 8, wherein the second processor, in operation:
after the pairing connection is established, based on whether reception information received from the stylus includes information related to the ID, determines whether a transmitter of the reception information is the stylus.

14. The position detecting system according to claim 13, wherein the information related to the ID is a hash value of the ID.

* * * * *